United States Patent
Vazny et al.

(10) Patent No.: US 11,539,387 B2
(45) Date of Patent: *Dec. 27, 2022

(54) EFFICIENT DUAL-POLARIZATION MULTI-INPUT AND MULTI-OUTPUT SYSTEM

(71) Applicant: Apple Inc., Cupertino, CA (US)

(72) Inventors: Rastislav Vazny, Sunnyvale, CA (US); Joonhoi Hur, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/084,283

(22) Filed: Oct. 29, 2020

(65) Prior Publication Data

US 2021/0091812 A1  Mar. 25, 2021

Related U.S. Application Data

(63) Continuation of application No. 16/582,783, filed on Sep. 25, 2019, now Pat. No. 10,826,545.

(51) Int. Cl.
| | | |
|---|---|---|
| *H04B 1/10* | (2006.01) | |
| *H04B 7/08* | (2006.01) | |
| *H01Q 1/52* | (2006.01) | |
| *H04B 7/0413* | (2017.01) | |
| *H01Q 21/00* | (2006.01) | |

(52) U.S. Cl.
CPC ........... *H04B 1/1081* (2013.01); *H01Q 1/521* (2013.01); *H01Q 21/00* (2013.01); *H04B 7/0413* (2013.01); *H04B 7/0837* (2013.01)

(58) Field of Classification Search
CPC .. H04B 1/1081; H04B 7/0413; H04B 7/0837; H01Q 1/521; H01Q 21/00
See application file for complete search history.

(56) References Cited

U.S. PATENT DOCUMENTS

| | | | |
|---|---|---|---|
| 6,125,109 A | 9/2000 | Fuerter | |
| 6,424,817 B1* | 7/2002 | Hadden | H04B 7/18517 455/3.02 |
| 6,658,269 B1 | 12/2003 | Golemon et al. | |
| 2010/0144289 A1 | 6/2010 | Haskell et al. | |
| 2013/0065547 A1 | 3/2013 | Suzuki | |
| 2014/0306967 A1 | 10/2014 | Yang et al. | |
| 2018/0084105 A1* | 3/2018 | Hiscock | H04W 4/021 |
| 2019/0159045 A1 | 5/2019 | Negus et al. | |

OTHER PUBLICATIONS

Timo Huusari, "Analog RF Cancellation of Self Interference in Full-Duplex Tranceivers", Tampere University of Technology, Master of Science Thesis (approved by the Council of the Faculty of Computing and Electrical Engineering), Aug. 13, 2014, 72 pages.

Chun-Xu Mao, et al., "Integrated Dual-Band Filtering/Duplexing Antennas", IEEE Access—Special Section On Multi-Function RF Components for Current and Future 5G Wireless Communications, vol. 6, 2018, 9 pages.

* cited by examiner

*Primary Examiner* — Janice N Tieu

(74) *Attorney, Agent, or Firm* — Fletcher Yoder PC

(57) ABSTRACT

Systems and methods for extracting polarized sub-signals from a dual-polarized signal includes isolating the polarized sub-signals using one or more filters. When a single filter is used to derive a first sub-signal, analog interference cancellation may be used to derive the second sub-signal. When two filters are used, the first and second sub-signals may each be derived using a corresponding filter.

20 Claims, 11 Drawing Sheets

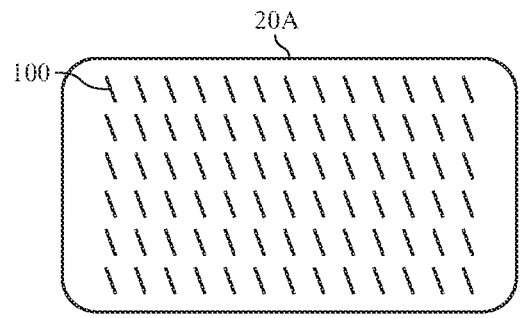
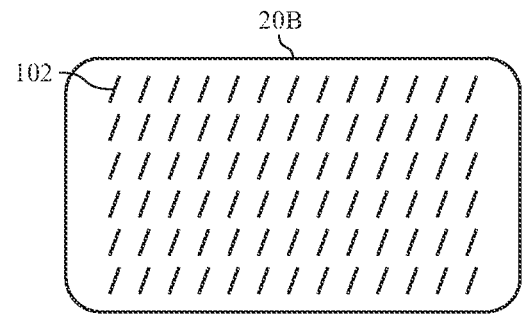
FIG. 7A
FIG. 7B
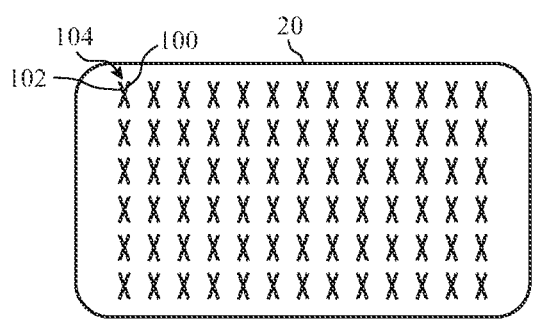
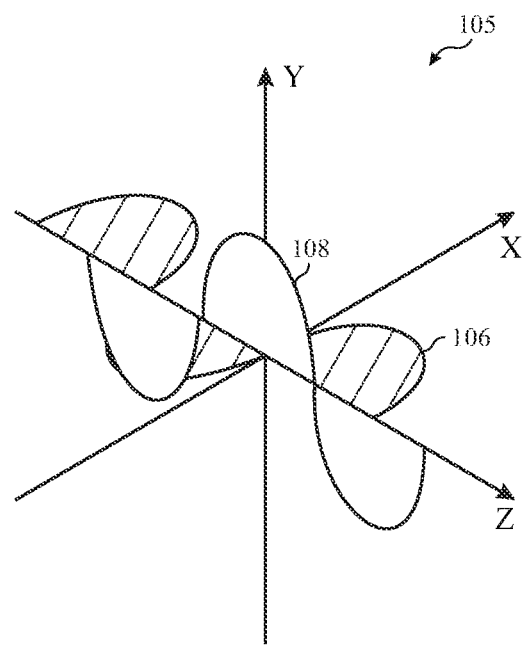
FIG. 8
FIG. 9

EFFICIENT DUAL-POLARIZATION MULTI-INPUT AND MULTI-OUTPUT SYSTEM

CROSS REFERENCE TO RELATED APPLICATIONS

This application is a continuation of U.S. application Ser. No. 16/582,783, entitled "EFFICIENT DUAL-POLARIZATION MULTI-INPUT AND MULTI-OUTPUT SYSTEM", filed Sep. 25, 2019, which is hereby incorporated by reference in its entirety for all purposes.

BACKGROUND

The present disclosure relates generally to wireless communication systems and, more specifically, to systems and methods for dual-polarization (DP) multi-input and multi-output (MIMO) systems.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As modern society becomes increasingly dependent on electronic data communications (e.g., wireless communications), the abundance of information transferred continues to increase. To increase throughput by increasing spectral efficiency, MIMO systems may send and/or receive more than one data signal simultaneously over a same radio channel. One method of performing such simultaneous transformation is to polarize two signals orthogonally to each other during transmission, such that both signals are concurrently transmittable in the same space. The signals may be separated from a dual-polarized signal using band-pass filters (BPFs). However, BPFs have relatively high costs and area consumption and greatly influence the cost and area of electronic devices incorporating the BPFs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Certain wireless electronic devices use dual-polarized signals that have orthogonally polarized sub-signals. These dual-polarized signals may be simultaneously transmitted through a common medium (e.g., a transmission line/cable). However, the constituent sub-signals are to be separated after the transmission through the common medium. Isolation circuitry may be used to isolate the constituent polarized sub-signals from the dual-polarized signal and from each other. One method of separating the constituent polarized sub-signals from the dual-polarized signal and from each other includes assigning each of the constituent polarized sub-signals different frequencies and using bandpass filters (BPFs) for each respective path to which each of the constituent polarized sub-signals corresponds. The BPFs may include physical BPFs or N-path BPFs. At least one of the BPFs may be replaced with a notch filter or N-path notch filter.

Alternatively or additionally, at least one of the BPFs may be omitted by instead using analog interference cancellation. A remaining BPF (or notch filter) derives one of the constituent polarized sub-signals from the dual-polarized signal. The derived constituent polarized sub-signal is sent to a proper path for processing. The derived constituent polarized sub-signal is also sent to interference circuitry that delays the derived constituent polarized sub-signal out of phase (i.e., 180° out of phase) with its corresponding component in the dual-polarized signal. When the amplitude of the delayed constituent polarized sub-signal matches an amplitude (e.g., using an amplifier) of the original corresponding polarized sub-signal in the dual-polarized signal, summing the dual-polarized signal with the delayed constituent polarized sub-signal cancels out the delayed constituent polarized sub-signal in the dual-polarized signal. After cancellation, only the remaining polarized sub-signal that was filtered out in the remaining BPF (or notch filter) is left. Thus, two of the constituent polarized sub-signals may be derived from the dual-polarized signal after transmission on a radio-frequency (RF) cable using only a single BPF or notch filter.

BRIEF DESCRIPTION OF THE DRAWINGS

Various aspects of this disclosure may be better understood upon reading the following detailed description and upon reference to the drawings in which:

FIG. 7A is a diagram of antenna array that receives and/or transmits signals having a first polarity, in accordance with embodiments of the present disclosure;

FIG. 7B is a diagram of antenna array that receives and/or transmits signals having a second polarity, in accordance with embodiments of the present disclosure;

FIG. 8 is a diagram of compound antenna array that receives and/or transmits signals dual-polarized signals having first and second polarities, in accordance with embodiments of the present disclosure;

FIG. 9 is a diagram of the dual-polarized signal of FIG. 8, in accordance with embodiments of the present disclosure;

DETAILED DESCRIPTION OF SPECIFIC EMBODIMENTS

Figure 1:
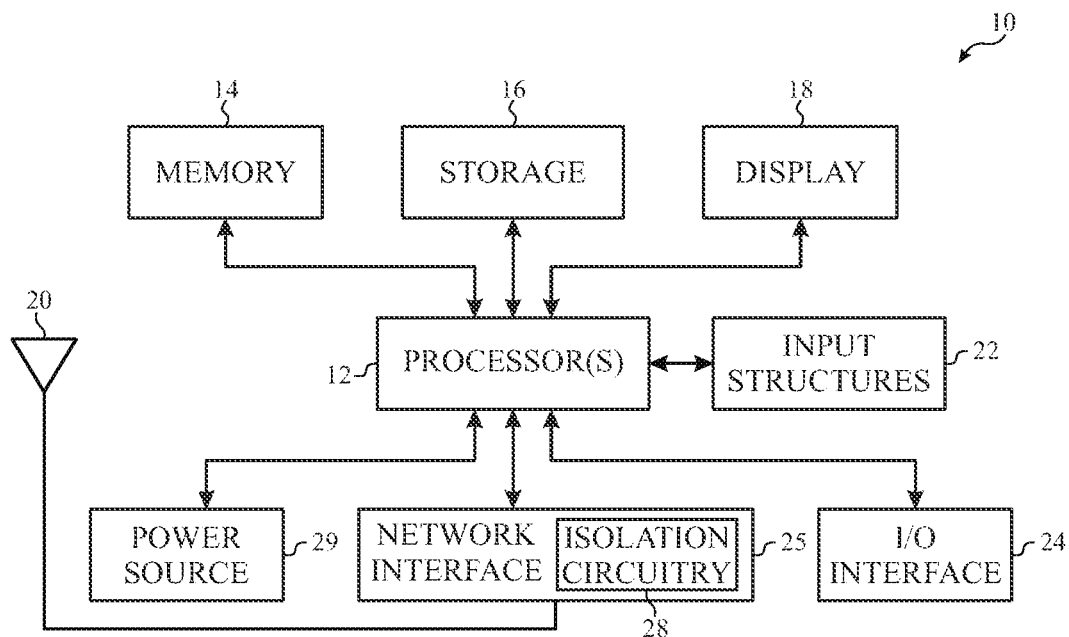
FIG. 1 is a block diagram of an electronic device that includes isolation circuitry to enable isolation of polarizes signals from a transmission of a dual-polarized signal over a radio-frequency (RF) cable, in accordance with an embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As previously noted, dual-polarized signals having two constituent polarized signals may be simultaneously transmitted through a common medium. However, the constituent polarized signals are to be separated after the transmission through the common medium (e.g., radio-frequency (RF) cable) before processing and/or transmission through another medium (e.g., dedicated paths for each constituent polarized signal). Isolation circuitry may be used to isolate the constituent polarized signals from the dual-polarized signal and from each other. One method of separating the constituent polarized signals from the dual-polarized signal and from each other includes assigning each of the constituent polarized signals different frequencies and using two filters for each respective path to which each of the constituent polarized signals corresponds. The filters may include physical bandpass filters (BPFs), N-path BPFs, physical notch filters, and/or N-path notch filters.

Additionally or alternatively, at least one of the filters may be omitted by instead using analog interference cancellation to obtain one of the constituent polarized signals. A remaining filter derives the other of the constituent polarized signals from the dual-polarized signal. The derived constituent polarized signal is sent to a proper path for processing and/or transmission. The derived constituent polarized signal is also used by the isolation circuitry to reconstruct the filtered part of the dual-polarized signal. To achieve this reconstruction, the isolation circuitry delays the derived constituent polarized signal out of phase (e.g., 180° out of phase) with its original position in the dual-polarized signal. The isolation circuitry may also amplify the delayed constituent polarized signal to a point before the dual-polarized signal was passed through the filter. When the amplitude of the delayed constituent polarized signal matches an amplitude of the original corresponding polarized signal in the dual-polarized signal, summing the dual-polarized signal with the delayed constituent polarized signal cancels out the delayed constituent polarized signal in the dual-polarized signal. After cancellation, only the remaining polarized signal that was filtered out in the remaining BPF (or notch filter) is left. Thus, two of the constituent polarized signals may be derived from the dual-polarized signal after transmission on the radio-frequency cable using only a single filter thereby potentially saving resource cost and/or area consumed by the isolation circuitry over multi-BPF isolation circuitry embodiments.

With the foregoing in mind, there are many suitable electronic devices that may benefit from the embodiments of DP MIMO separation described herein. Turning first to FIG. 1, an electronic device 10 according to an embodiment of the present disclosure may include, among other things, one or more processor(s) 12, memory 14, nonvolatile storage 16, a display 18, antenna array 20, input structures 22, an input/output (I/O) interface 24, a network interface 25, and a power source 29. The various functional blocks shown in FIG. 1 may include hardware elements (including circuitry), software elements (including computer code stored on a computer-readable medium), or a combination of both hardware and software elements. It should be noted that FIG. 1 is merely one example of a particular implementation and is intended to illustrate the types of components that may be present in electronic device 10.

Figure 2:
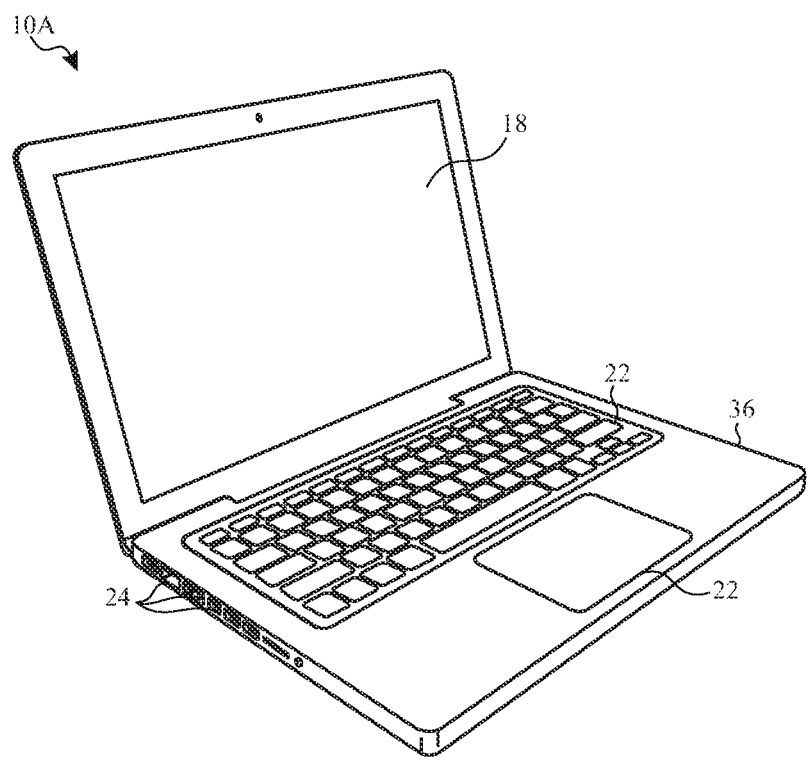
FIG. 2 is a perspective view of a notebook computer representing an embodiment of the electronic device of FIG. 1.
Figure 4:
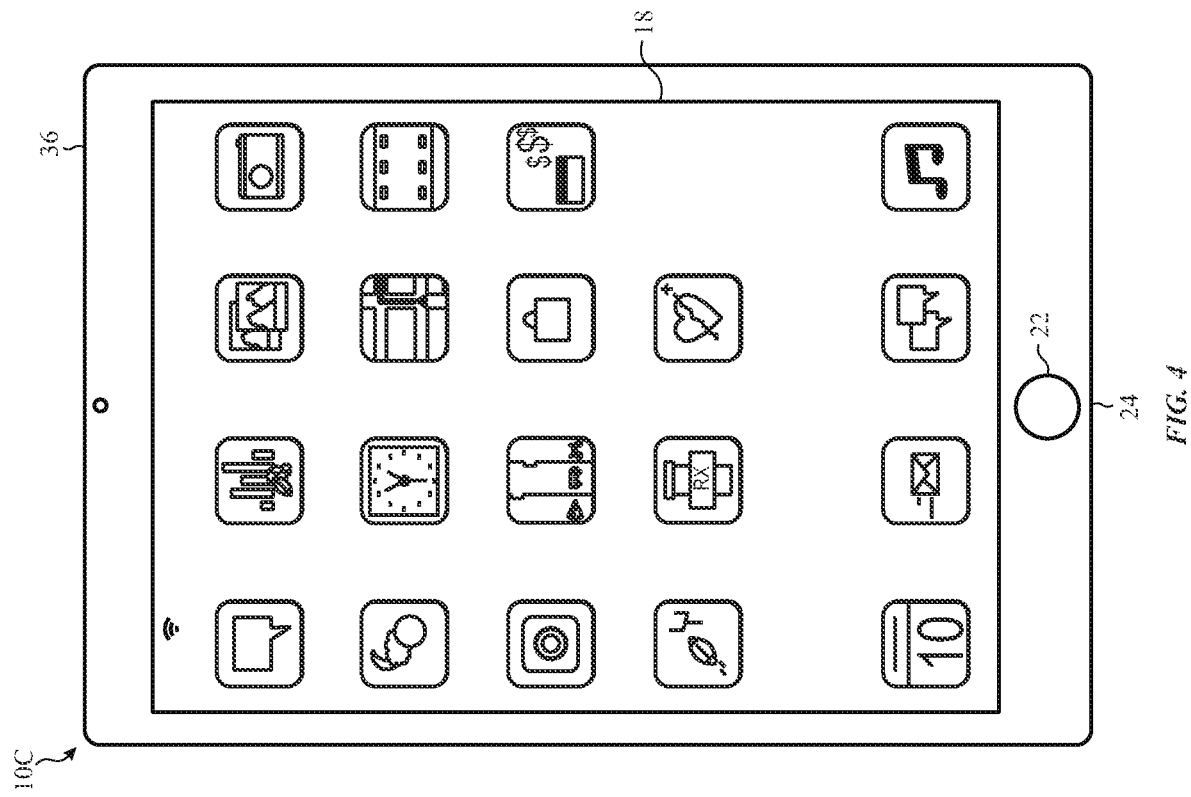
FIG. 4 is a front view of another hand-held device representing another embodiment of the electronic device of FIG. 1.
Figure 3:
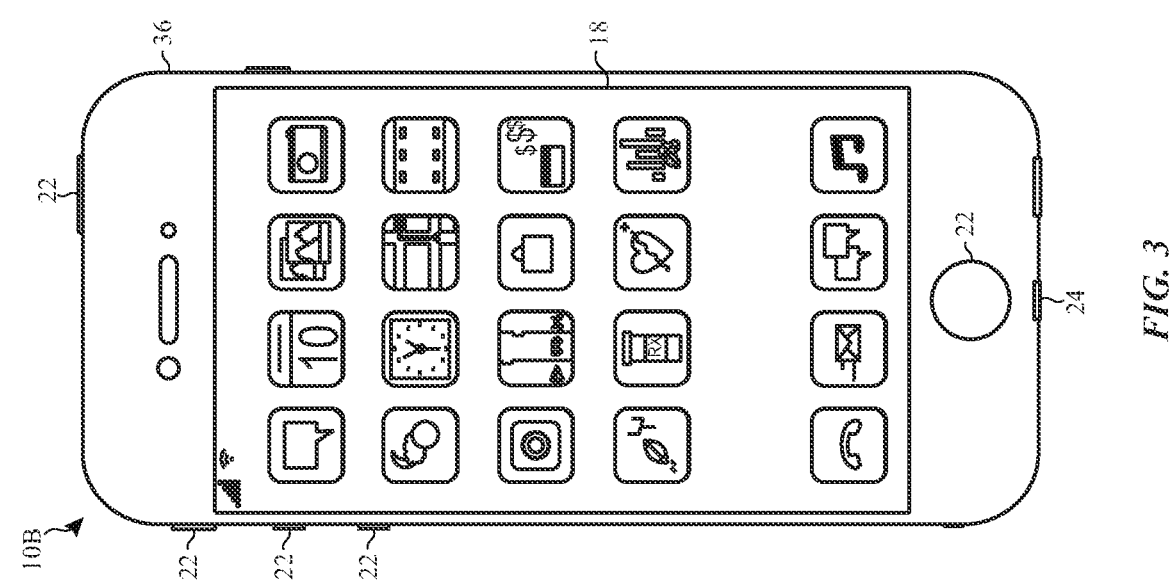
FIG. 3 is a front view of a hand-held device representing another embodiment of the electronic device of FIG. 1.
Figure 5:
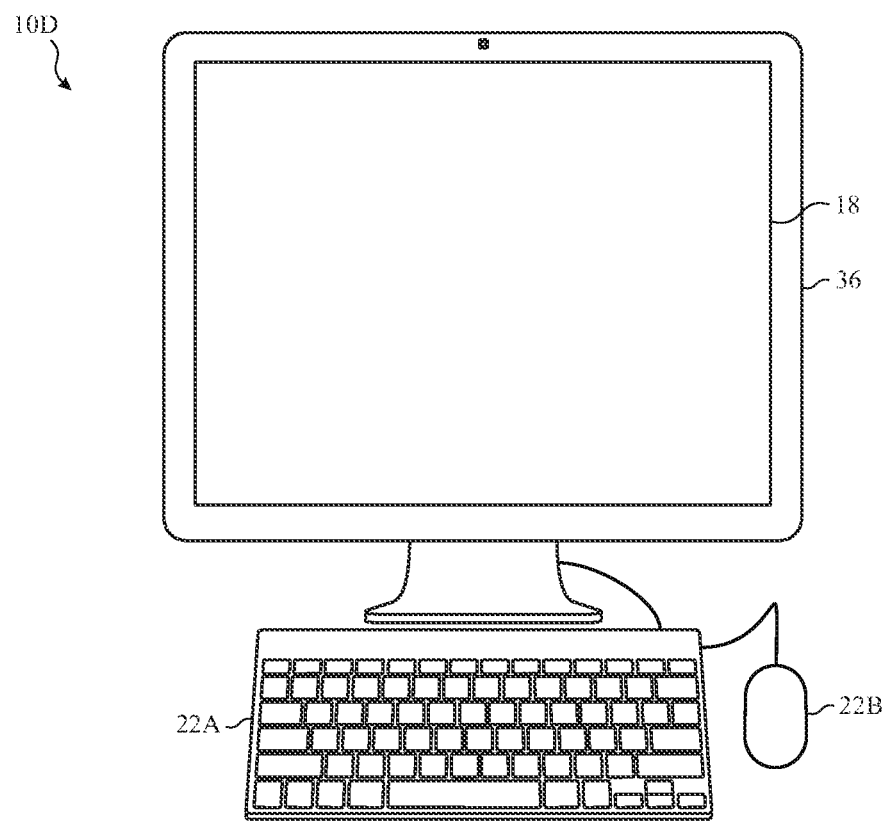
FIG. 5 is a front view of a desktop computer representing another embodiment of the electronic device of FIG. 1.
Figure 6:
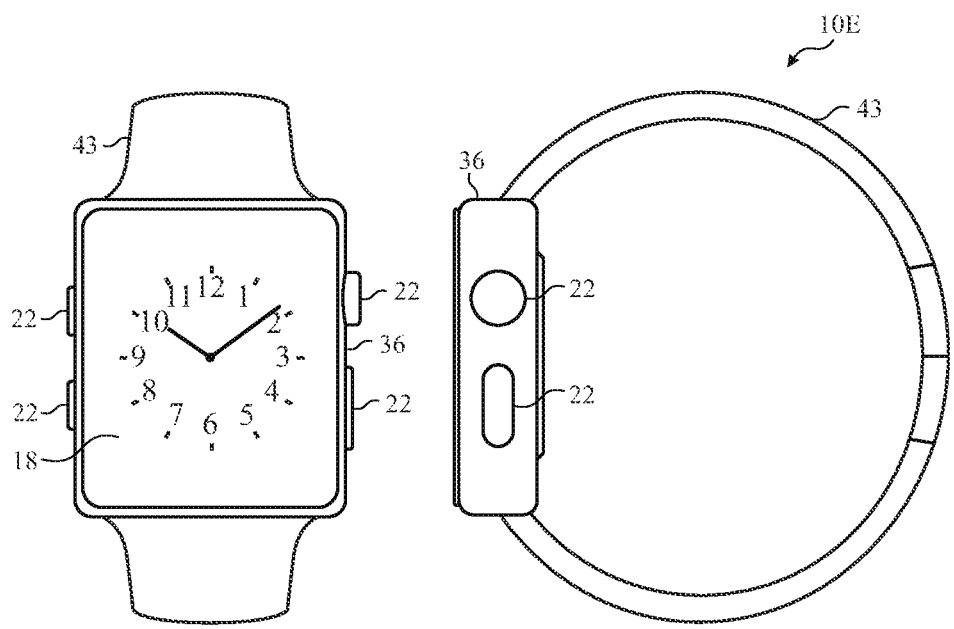
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 25. The network interface 25 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, or long term evolution license assisted access (LTE-LAA) cellular network, 5th generation (5G) cellular network, and/or 5G New Radio (5G NR) cellular network. The network interface 25 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. For example, network interfaces 25 may be capable of joining multiple networks, and may employ one or more antennas in the antenna array 20 to that end.

Additionally or alternatively, the network interfaces 25 may include isolation circuitry 28 that enables the electronic device to isolate two signals from a single DP MIMO signal on an radio-frequency cable (e.g., between the network interface 25 and the processor(s) 12/antennas of the antenna array 20). For example, the isolation circuitry 28 may separate the signals before being sent to the processor(s) 12 and/or before being sent to respective antenna elements for each of the polarized signals in the DP signal.

As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MACBOOK®, MACBOOK® PRO, MACBOOK AIR®, IMAC®, MAC® MINI, OR MAC PRO® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® OR IPHONE® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an IMAC®, a MACBOOK®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various input structures 22, such as the keyboard 22A or mouse 22B, which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an APPLE WATCH® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

With the foregoing in mind, FIGS. 7A and 7B illustrate antenna arrays 20A and 20B that include respective antenna elements 100 and 102. The antenna elements 100 and 102 are disposed locations that are at right angles to each other to provide polarity diversity for the electronic device 10. When mounted (e.g., on a pole or in the electronic device 10), the angle of the antenna elements 100 and 102 may be arranged at any angle with the ground as long as the antenna elements 100 and 102 perpendicular to each other. For instance, in some embodiments, the antenna elements 100 may be arranged parallel to a direction of gravity (e.g., vertical) while the antenna elements 102 are arranged perpendicular to the direction of gravity (e.g., horizontal). As used herein, the orientations are discussed as horizontal and vertical, but these directions may pertain to signals in any physical orientation relative to the direction of gravity.

The antenna array 20A has a first antenna polarity type (e.g., horizontal polarity) while the antenna array 20B has a second antenna polarity type (e.g., vertical polarity). In some embodiments, both polarity types may be combined into a dual-polarization type. For instance, antenna array 20C in FIG. 8 has a dual-polarity component 104 that includes the antenna elements 100 and 102 in single structure. Using the dual-polarity component 104, the antenna array 20C is a dual-polarity type antenna array that is able to communicate using both polarity types. For example, the antenna array 20C may simultaneously communicate with a first device having the antenna array 20A using the first antenna polarity type and a second device having the antenna array 20B using the second antenna polarity type. Alternatively, the antenna array 20C may simultaneously communicate with a device having the antenna array 20A using the first antenna polarity type and the same device having the antenna array 20B using the second antenna polarity type.

FIG. 9 is a three-dimensional graph of a dual-polarized signal 105. As illustrated, the dual-polarized signal 105 includes a horizontally polarized signal 106 and a vertically polarized signal 108. In addition to having different polarizations, the horizontally polarized signal 106 and the vertically polarized signal 108 may operate in different frequencies. For example, the horizontally polarized signal 106 may include signals in a first intermediate frequency range (IF1) while the vertically polarized signal 108 may include signals in a second intermediate frequency range (IF2). As intermediate frequency waves, at least one of the horizontally polarized signal 106 and the vertically polarized signal may operate in frequencies lower than a carrier wave used to send the wireless transmissions.

As previously discussed, at some point in the electronic device 10, the dual-polarized signal 105 may pass through a single radio-frequency (RF) cable. Alternatively, the horizontally polarized signal 106 and the vertically polarized signal 108 may be kept separate in the electronic device 10. However, by combining the horizontally polarized signal 106 and the vertically polarized signal 108 in transmission through the RF cable, the electronic device 10 may have a reduced area and/or cost of elements used to move the dual-polarized signal 105. Furthermore, by utilizing a single RF cable, the electronic device 10 may experience fewer coupling issues in moving the dual-polarized signal 105. The electronic device 10 utilizes the isolation circuitry 28 to isolate the horizontally polarized signal 106 and the vertically polarized signal 108 from the dual-polarized signal 105.

As previously discussed, relatively expensive and large band-pass filters (BPFs) may be used to separate the horizontally polarized signal 106 from the vertically polarized signal 108. Instead of filtering both frequencies directly using different BPFs, an RF cable 112 carrying the dual-polarized signal 105 may be coupled to filtration circuitry 114 of FIG. 10 utilizes analog interference cancellation. The filtration circuitry 114 (as part of the isolation circuitry 28) receives the dual-polarized signal 105 to split the dual-polarized signal 105 into the horizontally polarized signal 106 and the vertically polarized signal 108. Specifically, the filtration circuitry 114 derives the vertically polarized signal 108 from the dual-polarized signals 105 and outputs the vertically polarized signal 108 to a vertical path 120 then to vertical processing circuitry 122. The filtration circuitry 114 also outputs the horizontally polarized signal 106 output to a horizontal path 124 then to horizontal processing circuitry 126.

The vertical processing circuitry 122 may include any circuitry that is to perform a process on the filtered vertically polarized signal 108 on the vertical path 120. Similarly, the horizontal processing circuitry 126 may include any circuitry that is to perform a process on the filtered horizontally polarized signal 106. For instance, the vertical processing circuitry 122 and/or the horizontal processing circuitry 126 may include the processor(s) 12 or a suitable portion of an antenna array 20.

Figure 10:
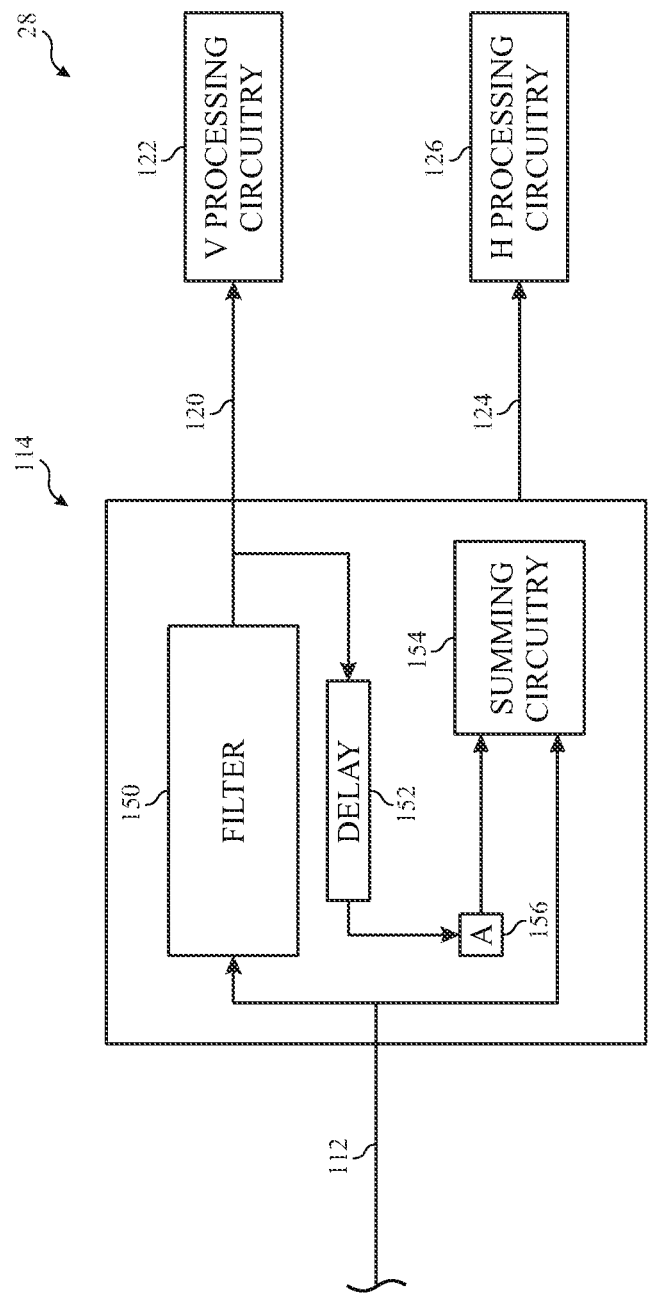
FIG. 10 is a block diagram of the isolation circuitry of FIG. 1 having a single filter and analog interference cancellation, in accordance with embodiments of the present disclosure.

As illustrated, the filtration circuitry 114 of FIG. 10 uses a single filter to isolate both the horizontally polarized signal 106 and the vertically polarized signal 108 from the dual-polarized signal 105. To cause analog interference cancellation, the output of the filter 150 is output to the vertical path 120 and also delayed in a delay 152. The delay 152 delays the output to make the phase response completely out of phase (e.g., 180 degrees out of phase) with the corresponding component (e.g., vertically polarized signal 108) in a copy of the dual-polarized signal 105 when the output of the delayed output of the filter 150 and the copy arrive at summing circuitry 154. The summing circuitry 154 may include an adder. For instance, the summing circuitry 154 may include a summing amplifier used to add two analog signals.

With the delayed output of the filter 150 out of phase with the corresponding components, they will at least partially cancel each other out. In some embodiments, some attenuation occurs when the dual-polarized signal 105 is filtered and/or the output of the filter 150 delayed. To offset this attenuation, an amplifier 156 may be included to amplify the output of the delayed output of the filter 150 to an amplitude approximately the same as the amplitude of the corresponding components in the dual-polarity signal 105. When the delay 152 delays the output of the filter 150 to be completely out of phase with the corresponding components and the amplifier 156 matches the delayed output of the filter 150 to the amplitude of the corresponding components, adding the delayed output of the filter 150 to the copy of the dual-polarized signal 105 results causes the corresponding components to interfere with each other leaving only portions of the dual-polarized signal 105 that were filtered out in the filter 150. In other words, the analog interference performed using the summing circuitry 154 leaves only the portion of the dual-polarized signal 105 that was filtered out in the filter 150 for output to the horizontal path 124. Thus, the analog interference performed in the filtration circuitry 114 of FIG.

10 isolates the horizontally polarized signal 106 and the vertically polarized signal 108 from the dual-polarized signal 105 without using two BPFs. Therefore, the filtration circuitry 114 of FIG. 10 may cost less and/or consume less area than the filtration circuitry using BPFs.

The amount of delay in the delay 152 may be set using empirical data. Additionally or alternatively, a factory calibration may indicate an amount of delay needed in the delay 152 to cause the delayed output of the filter 150 to be completely out of phase with the corresponding components of the dual-polarized signal. Furthermore, during the factory calibration, this delay amount may be accommodate any delays introduced via the amplifier 156. Additionally or alternatively, adaptive control of the filtration circuitry 114 may be applied and fine-tuned using a radio-frequency front-end control interface (RFFE).

Similar to the amount of delay in the delay 152, an amount of amplification in the amplifier may be set using factory calibration and/or RFFE tuning. For example, the factory calibration may be used to determine how much amplification is to be used to offset attenuation in the filter 150 and/or other portions of the filtration circuitry 114.

Figure 11:
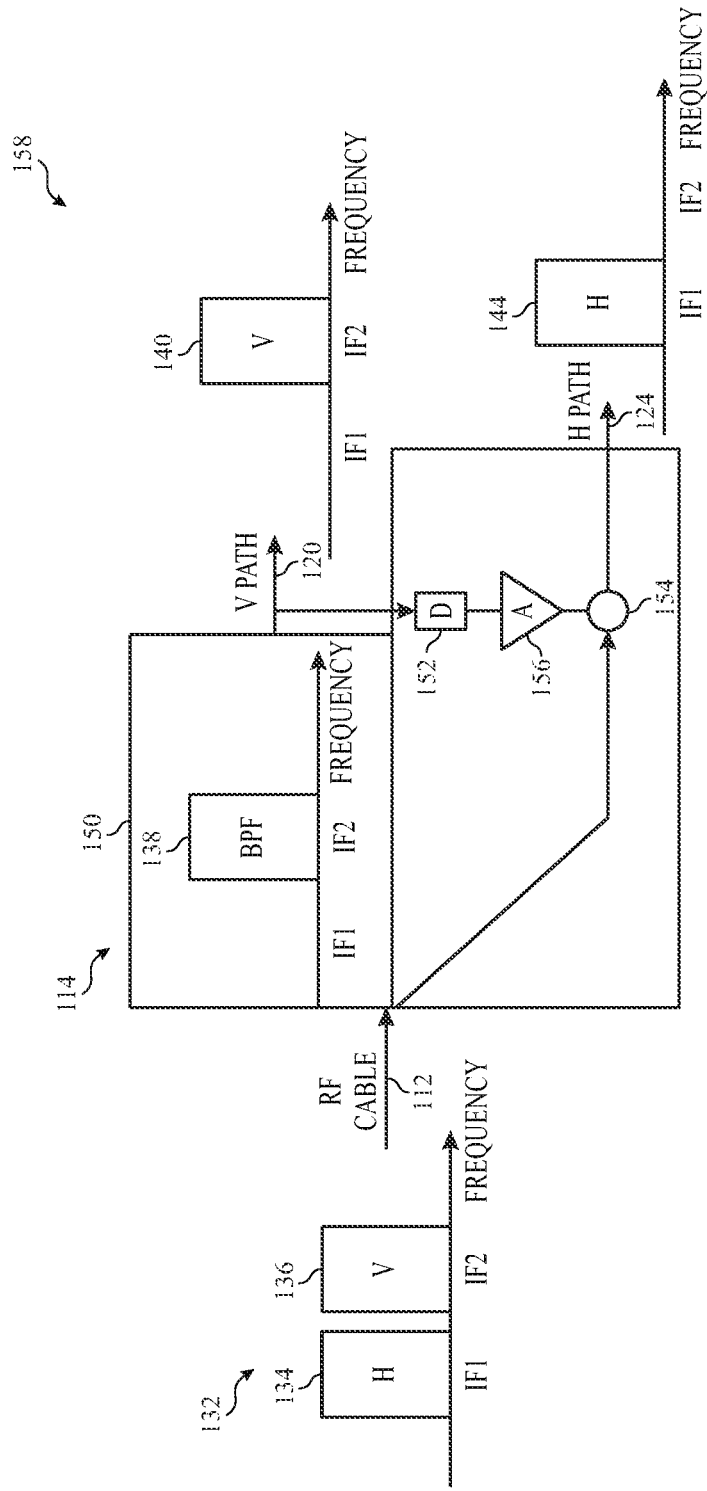
FIG. 11 is a diagram of an isolation using the isolation circuitry of FIG. 1 having a single BPF, in accordance with embodiments of the present disclosure.

FIG. 11 is a block diagram of an isolation 158 using an embodiment of the isolation circuitry 28 of FIG. 10 having a single BPF as the filter 150. The received dual-polarized signal 105 has a frequency domain representation 132 of the component signals. For instance, a bar 134 corresponds to the horizontally polarized signal 106 components of the dual-polarized signal 105. Similarly, a bar 136 corresponds to the vertically polarized signal 108 components of the dual-polarized signal 105. In the illustrated frequency domain representation 132, the horizontally polarized signal 106 and the vertically polarized signal 108 have similar amplitudes. However, the horizontally polarized signal 106 and the vertically polarized signal 108 may have different amplitudes.

In the illustrated embodiment, the filter 150 includes a BPF with a frequency response 138 includes a peak pass amplitude at the IF2 while blocking IF1. A frequency domain representation 140 of the filtered signal on the vertical path 120 shows that the horizontally polarized signal 106 has been removed. In other words, based on the frequency response, the filtered vertically polarized signal 108 is output from the filter 150 to the vertical path 120 for further use by the vertical processing circuitry 122.

The filter also outputs the vertically polarized signal 108 is output to the delay 152. The delayed vertically polarized signal 108 is then amplified in the amplifier 156. The delayed and amplified vertically polarized signal 108 is then added to the dual-polarized signal 105 using the summing circuitry 154. Since the delayed and amplified vertically polarized signal 108 is completely out of phase with the vertically polarized signal 108 in the dual-polarized signal 105 and has the same amplitude as the vertically polarized signal 108 in the dual-polarized signal 105, the summation cancels the vertically polarized signal 108 leaving only the horizontally polarized signal 106. The remaining horizontally polarized signal 106 is then transmitted through the horizontal path 124. A frequency domain representation 144 of the filtered signal on the horizontal path 124 shows that the vertically polarized signal 108 has been removed. In other words, based on the frequency response, the filtered horizontal polarized signal 106 is output from the filtration circuitry 114 to the horizontal path 124 for further use by the horizontal processing circuitry 126.

Figure 12:
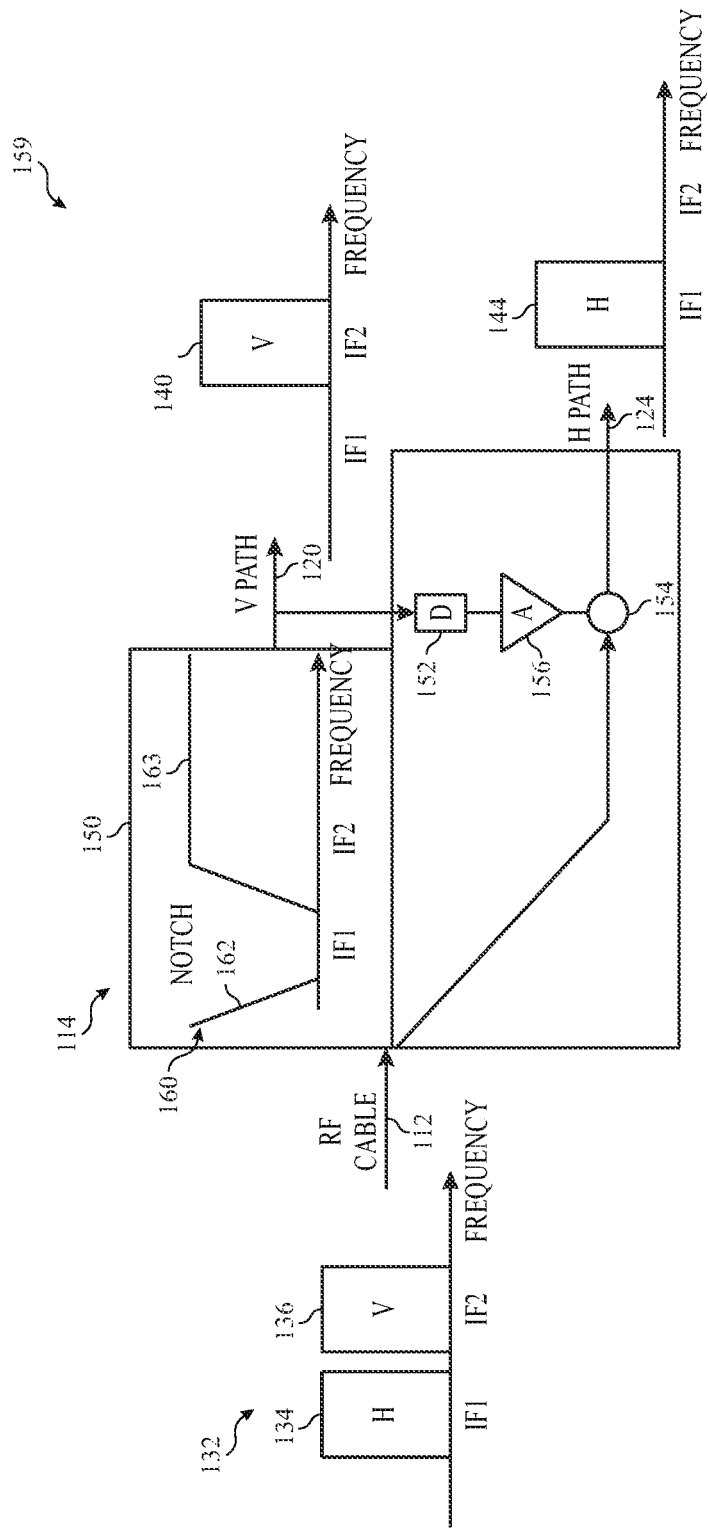
FIG. 12 is a diagram of an isolation using the isolation circuitry of FIG. 1 having a single notch filter, in accordance with embodiments of the present disclosure.

FIG. 12 is a block diagram of an isolation 159 using an embodiment of the isolation circuitry 28 of FIG. 10 using a notch filter for the filter 150. The notch filter has a frequency response 160 that blocks a blocked frequency range 161 corresponding to the IF1 while passing frequency ranges 162 and 163 where the frequency range 163 includes the IF2. Accordingly, the filter 150 passes the vertically polarized signal 108 to the vertical path 120 and the delay 152. The delay 152, the summing circuitry 154, and the amplifier 156 function as described in relation to FIG. 11 producing the horizontally polarized signal 106.

Figure 13:
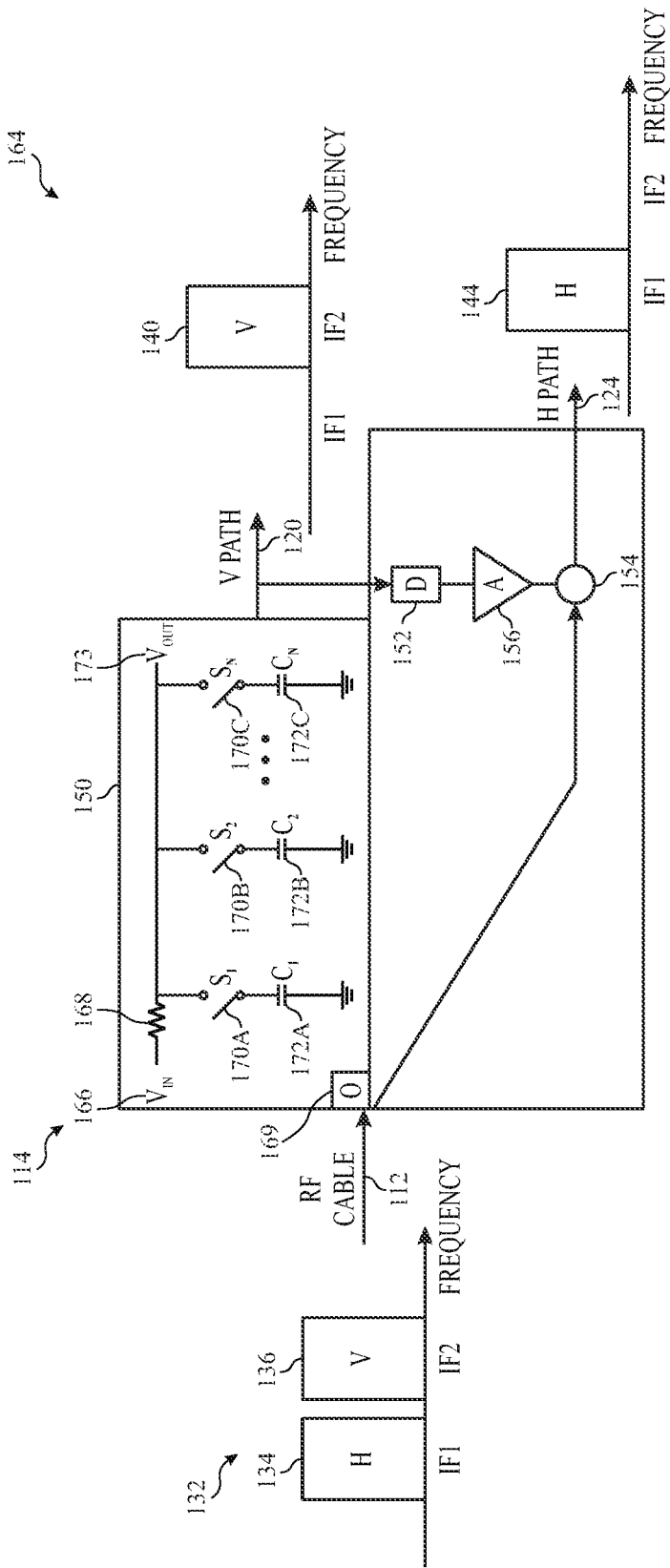
FIG. 13 is a diagram of an isolation using the isolation circuitry of FIG. 1 having a single N-path BPF, in accordance with embodiments of the present disclosure.

FIG. 13 is a block diagram of an isolation 164 using an embodiment of the isolation circuitry 28 of FIG. 10 using an N-path BPF for the filter 150. The illustrated N-path BPF receives the dual-polarized signal 105 at an input 166. The N-path BPF may include a resistor 168 and may use a local oscillator 169. The N-path BPF also includes switches 170 and capacitors 172. The switches 170 sequentially switch to couple a respective capacitor 172 with the resistor 168 to sequentially form multiple low-pass filters that function as a band pass filter when sequenced together. For example, the local oscillator 169 toggles switch 170A that couples the capacitor 172A to the resistor 168 to form a first low-pass filter. The local oscillator 169 causes the switch 170A to open and the switch 170B to close thereby forming a low-pass filter using the capacitor 172B and the resistor 168. The local oscillator 169 causes the N-path BPF to continue progressing through the switches until switch 170C is toggled to form a low-pass filter using the capacitor 172C and the resistor 168. The values for the resistor 168 and the capacitors 172 may be selected to pass the vertically polarized signal 108 while blocking the horizontally polarized signal 106 or vice versa. The N-path BPF provides BPF functionality with a smaller area and/or resource cost than physical BPF implementations. As illustrated, the N-path BPF filters out all frequencies except for the vertically polarized signal 108. Accordingly, the filter 150 passes the vertically polarized signal 108 to the vertical path 120 and the delay 152 via an output 173. The delay 152, the summing circuitry 154, and the amplifier 156 function as described in relation to FIG. 11 producing the horizontally polarized signal 106.

Figure 14:
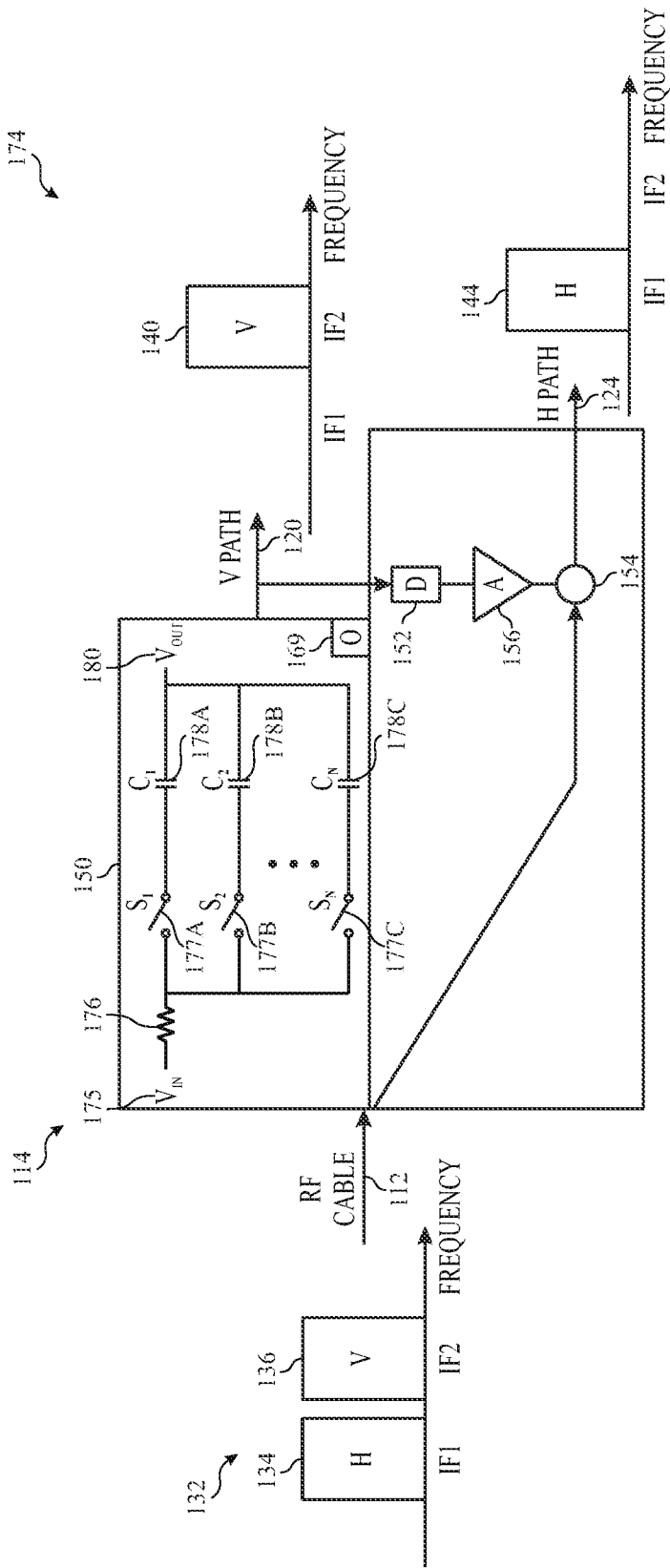
FIG. 14 is a diagram of an isolation using the isolation circuitry of FIG. 1 having a single N-path notch filter, in accordance with embodiments of the present disclosure.

FIG. 14 is a block diagram of an isolation 174 using an embodiment of the isolation circuitry 28 of FIG. 10 using an N-path notch filter for the filter 150. The illustrated N-path notch filter receives the dual-polarized signal 105 at an input 175. The N-path notch filter may include a resistor 176. The N-path notch filter also includes switches 177 and capacitors 178. The switches 177 sequentially switch to couple a respective capacitor 178 with the resistor 176 to sequentially form multiple high-pass filters that function as a notch filter together when sequentially enabled. For example, the local oscillator 169 toggles switch 177A that couples the capacitor 178A to the resistor 176 to form a first high-pass filter. The local oscillator 169 causes the switch 177A to open and the switch 177B to close thereby forming a high-pass filter using the capacitor 178B and the resistor 176. The local oscillator 169 causes the N-path notch filter to continue progressing through the switches until switch 177C is toggled to form a high-pass filter using the capacitor 178C and the resistor 176. The values for the resistor 168 and the capacitors 172 may be selected to pass the vertically polarized signal 108 while blocking the horizontally polarized signal 106 or vice versa. In other words, the N-path notch filter provides notch functionality similar to the notch filter in FIG. 12. Thus, the N-path notch filter filters out the horizontally polarized signal 106 leaving the vertically polarized signal 108 intact. Accordingly, the filter 150 passes the vertically polarized signal 108 to the vertical path 120 and the delay 152 via an output 180. The delay 152, the summing circuitry 154, and the amplifier 156 function as described in relation to FIG. 11 producing the horizontally polarized signal 106.

The foregoing embodiment related to analog interference cancellation generally discussed actively filtering out a lower frequency signal (e.g., the horizontally polarized signal 106) while reconstructing the lower frequency signal from a higher frequency signal (e.g., vertically polarized signal 108) remaining from the dual-polarized signal 105 after filtration. Alternatively, some embodiments may actively filter out the higher frequency signal while reconstructing the higher frequency signal from the lower frequency signal remaining from the dual-polarized signal 105 after filtration.

Figure 15:
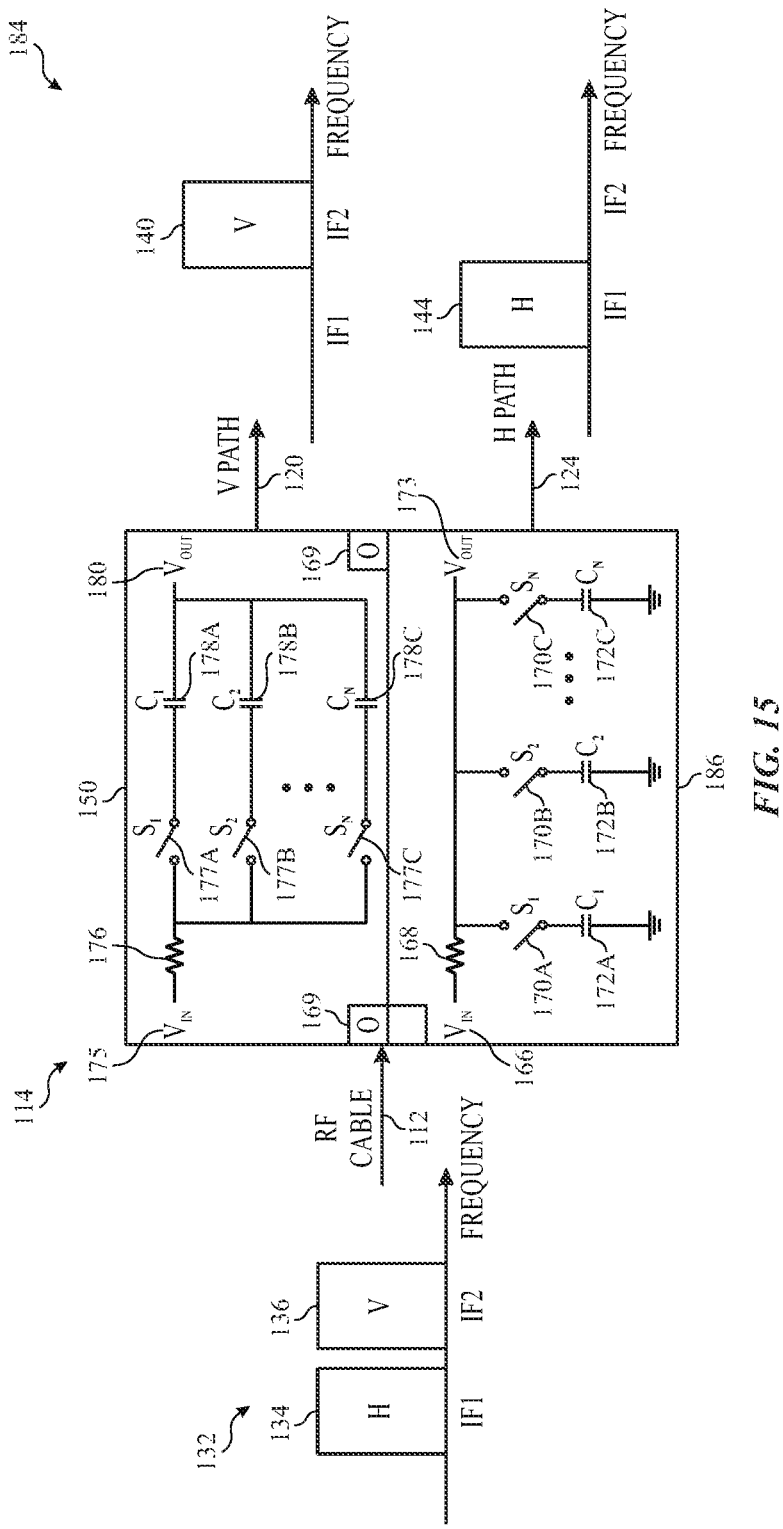
FIG. 15 is a diagram of an isolation using the isolation circuitry of FIG. 1 having two N-path filters, in accordance with embodiments of the present disclosure.

In some embodiments, N-path filters may be used to replace physical filters in a dual filter system. FIG. 15 illustrates a block diagram of a filtration 184 using an embodiment of the filtration circuitry 114 where the filter 150 is an N-path notch filter and an N-path BPF 186 is used instead of analog interference cancellation. The filter 150 is an N-path notch filter that is configured to block only the horizontally polarized signal 106 while passing the vertically polarized signal 108, and the N-path BPF 186 is an N-path BPF that is configured to pass the horizontally polarized signal 106. The use of the N-path filters further reduces resource cost and/or area of the filtration circuitry 114 (and the isolation circuitry 28) while enabling simultaneous transmission of the horizontally polarized signal 106 and the vertically polarized signal 108 over the RF cable 112.

In the illustrated embodiment of the filtration circuitry 114, since both the filter 150 and the N-path BPF 186 are N-path filters, both the filter 150 and the N-path BPF 186 use local oscillation. In some embodiments, the local oscillator 169 may be used to drive switching of the switches 177 in the filter 150 with oscillations of the local oscillator 169 and may also be used to drive switching of the switches 170 of the N-path BPF 186. Alternatively, the filter 150 and the N-path BPF 186 may each have its own local oscillator 169.

Figure 16:
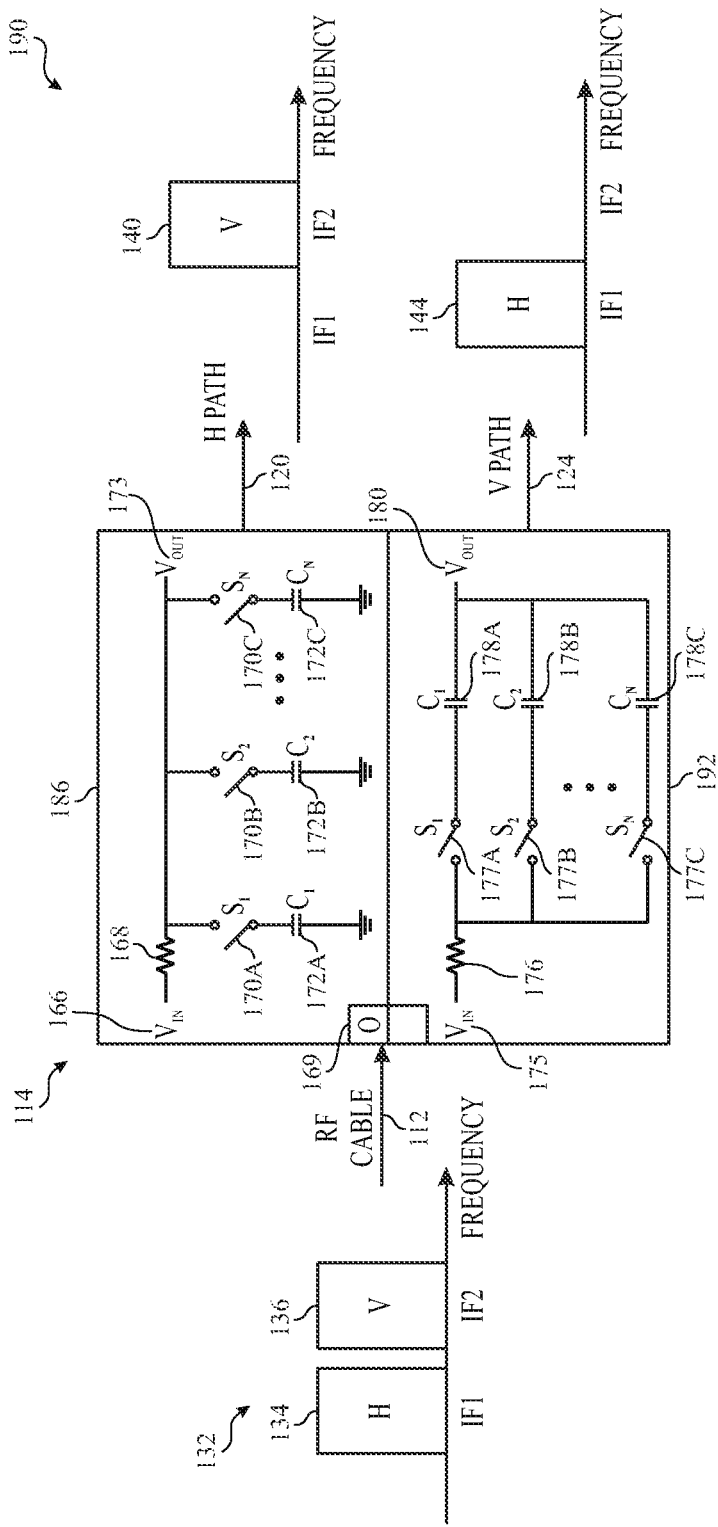
FIG. 16 is a diagram of an isolation using the isolation circuitry of FIG. 1 having an alternative arrangement of two N-path filters, in accordance with embodiments of the present disclosure.

The functions of the N-type filters may be inverted from those shown in FIG. 15. For instance, FIG. 16 illustrates a block diagram of a filtration 190 using an embodiment of the filtration circuitry 114 where the filter 150 is an N-path BPF and the N-path BPF 186 is an N-path notch filter. The filter 150 is an N-path BPF that is configured to pass only the vertically polarized signal 108, and an N-path notch filter 192 that is configured to block the vertically polarized signal 108 and to pass the horizontally polarized signal 106. As previously noted, the use of the N-path filters further reduces resource cost and/or area of the filtration circuitry 114 (and the isolation circuitry 28) while enabling simultaneous transmission of the horizontally polarized signal 106 and the vertically polarized signal 108 over the RF cable 112.

Similar to the local oscillation scheme discussed in relation to FIG. 15. The filtration circuitry 114 of FIG. 16 may reuse oscillation for both the filter 150 and the N-path notch filter 192. In other words, a single local oscillator 169 may be used to drive the switching of the switches 170 in the filter 150 with oscillations and to drive switching of the switches 177 of the IF2 filter 118. Alternatively, the filter 150 and the IF2 filter 118 may each have its own local oscillator 169.

The specific embodiments described above have been shown by way of example, and it should be understood that these embodiments may be susceptible to various modifications and alternative forms. For example, the methods may be applied for embodiments having different numbers and/or locations for antennas, different groupings, and/or different networks. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. Isolation circuitry, comprising:
an input configured to receive a dual-polarized signal having a first polarized component having a first frequency and a second polarized component having a second frequency;
a first N-path filter having a first frequency response configured to remove the first polarized component from the dual-polarized signal to derive a first signal having the second polarized component; and
a second N-path filter having a second frequency response configured to remove the second polarized component from the dual-polarized signal to derive a second signal having the first polarized component.

2. The isolation circuitry of claim 1, wherein the first N-path filter comprises an N-path bandpass filter configured to pass a frequency range including the second polarized component while blocking frequencies other than the frequency range, and the second N-path filter comprises an N-path notch filter configured to block the frequency range while passing frequencies other than the frequency range.

3. The isolation circuitry of claim 2, comprising an oscillator configured to drive a first set of switches in the N-path bandpass filter and a second set of switches in the N-path notch filter.

4. The isolation circuitry of claim 2, comprising a first oscillator configured to drive a first set of switches in the N-path bandpass filter and a second oscillator configured to drive a second set of switches in the N-path notch filter.

5. The isolation circuitry of claim 1, wherein the input is configured to receive the dual-polarized signal from a dual-polarization antenna over a single connection.

6. The isolation circuitry of claim 5, wherein the single connection comprises a radio-frequency cable transmitting the first polarized component and the second polarized component concurrently.

7. The isolation circuitry of claim 1, wherein the first polarized component comprises a horizontally polarized component, and the second polarized component comprises a vertically polarized component.

8. The isolation circuitry of claim 7, wherein the first N-path filter comprises a notch filter, and the second N-path filter comprises a bandpass filter.

9. The isolation circuitry of claim 7, wherein the first N-path filter comprises a bandpass filter, and the second N-path filter comprises a notch filter.

10. An electronic device having an isolation circuitry, comprising:

an antenna configured to receive wireless signals and generate a dual-polarized signal over a radio-frequency cable;

a first N-path filter electrically coupled to the antenna and configured to filter the dual-polarized signal to obtain a first polarized signal having a first frequency;

a second N-path filter coupled to the antenna and configured to filter the dual-polarized signal to obtain a second polarized signal having a second frequency;

a first output configured to output the first polarized signal to a first path; and a second output configured to output the second polarized signal to a second path.

11. The electronic device of claim 10, wherein the first N-path filter comprises a bandpass filter configured to block frequencies outside of a pass frequency range that includes the first frequency.

12. The electronic device of claim 11, wherein the second N-path filter comprises a notch filter that is configured to block a block frequency range that includes the second frequency.

13. The electronic device of claim 10, comprising a processor configured to:
receive the first polarized signal from the first output; and
perform data processing on the first polarized signal.

14. The electronic device of claim 10, wherein the first path is configured to deliver the first polarized signal to a portion of an antenna array to transmit out the first polarized signal.

15. The electronic device of claim 10, comprising a processor configured to:
receive the second polarized signal from the second output; and
perform data processing on the second polarized signal.

16. The electronic device of claim 10, wherein the second path is configured to deliver the second polarized signal to a portion of an antenna array to transmit out the second polarized signal.

17. A method, comprising:
receiving, at an input to isolation circuitry, a dual-polarized signal;
filtering, in the isolation circuitry, the dual-polarized signal using a first N-path filter to obtain a first polarized signal having a first frequency;
filtering, in the isolation circuitry, the dual-polarized signal using a second N-path filter to obtain a second polarized signal having a second frequency;
outputting the first polarized signal to a first path after filtering the dual-polarized signal using the first N-path filter; and
outputting the second polarized signal to a second path after filtering the dual-polarized signal using the second N-path filter.

18. The method of claim 17, comprising:
driving a first set of switches in the first N-path filter using an oscillator; and
driving a second set of switches in the second N-path filter using the oscillator.

19. The method of claim 17, comprising:
driving a first set of switches in the first N-path filter using a first local oscillator; and
driving a second set of switches in the second N-path filter using a second local oscillator.

20. The method of claim 17, wherein filtering the dual-polarized signal using the first N-path filter comprises passing a pass frequency range that includes the first polarized signal and blocking all other frequencies including the second polarized signal, and wherein filtering the dual-polarized signal using the second N-path filter comprises blocking a block frequency range that includes the first polarized signal and passing all other frequencies including the second polarized signal.

* * * * *